US012784756B2

(12) United States Patent
Wuebbolt et al.

(10) Patent No.: US 12,784,756 B2
(45) Date of Patent: Nov. 3, 2026

(54) METHODS, APPARATUS AND SYSTEMS FOR ENCODING AND DECODING OF MULTI-CHANNEL AMBISONICS AUDIO DATA

(71) Applicant: Dolby Laboratories Licensing Corporation, San Francisco, CA (US)

(72) Inventors: Oliver Wuebbolt, Hannover (DE); Peter Jax, Hannover (DE); Johannes Boehm, Göttingen (DE)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 95 days.

(21) Appl. No.: 19/019,225

(22) Filed: Jan. 13, 2025

(65) Prior Publication Data

US 2025/0322834 A1 Oct. 16, 2025

Related U.S. Application Data

(60) Continuation of application No. 18/489,606, filed on Oct. 18, 2023, now Pat. No. 12,205,600, which is a (Continued)

(30) Foreign Application Priority Data

Jul. 19, 2012 (EP) .................................... 12290239

(51) Int. Cl.

*G10L 19/008* (2013.01)
*G10L 19/16* (2013.01)

(Continued)

(52) U.S. Cl.

CPC ............ *G10L 19/008* (2013.01); *H04S 3/008* (2013.01); *G10L 19/167* (2013.01); *H04R 5/027* (2013.01);

(Continued)

(58) Field of Classification Search

CPC ..... G10L 19/008; G10L 19/167; H04S 3/008; H04S 2400/01; H04S 2400/03;

(Continued)

(56) References Cited

U.S. PATENT DOCUMENTS 7,783,493 B2 8/2010 Pang
7,788,107 B2 8/2010 Oh et al.

(Continued)

FOREIGN PATENT DOCUMENTS

CN 1973320 B 12/2010
CN 102568487 B 9/2014

(Continued)

OTHER PUBLICATIONS

Abhayapala, Thushara D. "Generalized Framework for Spherical Microphone Arrays: Spatial and Frequency Decomposition" IEEE International Conference on Acoustics, Speech, and Signal Processing (ICASSP), vol. X, pp. 5268-5271, Apr. 2008.

(Continued)

*Primary Examiner* — Brian L Albertalli

(57) ABSTRACT

Conventional audio compression technologies perform a standardized signal transformation, independent of the type of the content. Multi-channel signals are decomposed into their signal components, subsequently quantized and encoded. This is disadvantageous due to lack of knowledge on the characteristics of scene composition, especially for e.g. multi-channel audio or Higher-Order Ambisonics (HOA) content. A method for decoding an encoded bitstream of multi-channel audio data and associated metadata is provided, including transforming the first Ambisonics format of the multi-channel audio data to a second Ambisonics format representation of the multi-channel audio data, wherein the transforming maps the first Ambisonics format of the multi-channel audio data into the second Ambisonics (Continued)

format representation of the multi-channel audio data. A method for encoding multi-channel audio data that includes audio data in an Ambisonics format, wherein the encoding includes transforming the audio data in an Ambisonics format into encoded multi-channel audio data is also provided.

3 Claims, 3 Drawing Sheets

Related U.S. Application Data continuation of application No. 17/392,210, filed on Aug. 2, 2021, now Pat. No. 11,798,568, which is a division of application No. 16/580,738, filed on Sep. 24, 2019, now Pat. No. 11,081,117, which is a division of application No. 16/403,224, filed on May 3, 2019, now Pat. No. 10,460,737, which is a division of application No. 15/967,363, filed on Apr. 30, 2018, now Pat. No. 10,381,013, which is a division of application No. 15/417,565, filed on Jan. 27, 2017, now Pat. No. 9,984,694, which is a continuation of application No. 14/415,714, filed as application No. PCT/EP2013/065343 on Jul. 19, 2013, now Pat. No. 9,589,571.

(51) Int. Cl.
*H04R 5/027* (2006.01)
*H04S 3/00* (2006.01)

(52) U.S. Cl.
CPC ....... *H04S 2400/01* (2013.01); *H04S 2400/03* (2013.01); *H04S 2400/15* (2013.01); *H04S 2420/03* (2013.01); *H04S 2420/11* (2013.01)

(58) Field of Classification Search
CPC ............. H04S 2400/15; H04S 2420/03; H04S 2420/11; H04R 5/027
See application file for complete search history.

(56) References Cited

U.S. PATENT DOCUMENTS

| | | | | |
|---|---|---|---|---|
| 9,271,081 | B2 | 2/2016 | Corteel et al. | |
| 9,478,225 | B2 * | 10/2016 | Sen | H04S 3/008 |
| 9,589,571 | B2 | 3/2017 | Wuebbolt | |
| 9,788,133 | B2 | 10/2017 | Sen | |
| 9,984,694 | B2 | 5/2018 | Wuebbolt | |
| 10,381,013 | B2 | 8/2019 | Wuebbolt | |
| 10,460,737 | B2 | 10/2019 | Wuebbolt | |
| 2004/0049379 | A1 | 3/2004 | Thumpudi et al. | |
| 2006/0020474 | A1 | 1/2006 | Stewart et al. | |
| 2006/0126852 | A1 | 6/2006 | Bruno et al. | |
| 2008/0235035 | A1 | 9/2008 | Oh et al. | |
| 2011/0173009 | A1 | 7/2011 | Fuchs | |
| 2011/0222694 | A1 | 9/2011 | Del Galdo et al. | |
| 2011/0305344 | A1 | 12/2011 | Sole | |
| 2012/0014527 | A1 | 1/2012 | Furse | |
| 2012/0057715 | A1 | 3/2012 | Johnston | |
| 2012/0155653 | A1 | 6/2012 | Jax et al. | |
| 2013/0108077 | A1 | 5/2013 | Edler | |
| 2013/0216070 | A1 | 8/2013 | Keiler et al. | |
| 2013/0282387 | A1 | 10/2013 | Philippe | |
| 2014/0016784 | A1 | 1/2014 | Sen | |
| 2014/0016786 | A1 | 1/2014 | Sen | |
| 2014/0016802 | A1 | 1/2014 | Sen | |
| 2014/0133683 | A1 | 5/2014 | Robinson | |
| 2014/0350944 | A1 | 11/2014 | Jot et al. | |
| 2015/0124973 | A1 | 5/2015 | Arteaga | |

FOREIGN PATENT DOCUMENTS

| | | | |
|---|---|---|---|
| CN | 104471960 | B | 3/2017 |
| EP | 2094032 | A1 | 8/2009 |
| EP | 2449795 | | 5/2012 |
| EP | 2688066 | A1 | 1/2014 |
| JP | 4855925 | | 1/2012 |
| KR | 2001-0009258 | | 2/2001 |
| KR | 2014-0027954 | | 3/2014 |
| TW | 200818700 | | 4/2008 |
| TW | 201011737 | | 3/2010 |
| WO | 2010/076040 | | 7/2010 |
| WO | 2011000409 | A1 | 1/2011 |
| WO | 2011073210 | A1 | 6/2011 |
| WO | 2012033950 | A1 | 3/2012 |
| WO | 2012/085410 | | 6/2012 |

OTHER PUBLICATIONS

Boehm, Johannes "Decoding for 3D" AES presented at the 130th Convention, May 13-16, 2011, London, UK, pp. 1-13.
Cheng, B. et al "Encoding Independent Sources in Spatially Squeezed Surround Audio Coding" Advances in Multimedia Information Processing A PCM, Dec. 11, 2007, pp. 804-813.
Daniel, Jerome "Spatial Sound Encoding Including Near Field Effect: Introducing Distance Coding Filters and a Viable New Ambisonic Format" AES 23rd International Conference: Signal Processing in Audio Recording and Reproduction, Copenhagen, Denmark, May 23-25, 2003, pp. 1-15.
Dobson, Richard W. "Developments in Audio File Formats" ICMC 2000, pp. 1-4.
Driscoll, J. et al "Computing Fourier Transforms and Convolutions on the 2-Sphere" Advances in Applied Mathematics 15, pp. 202-250, 1994.
Engdegard, J et al "Spatial Audio Object Coding (SAOC)—The Upcoming MPEG Standard on Parametric Object Based Audio Coding" AES presented at the 124th Convention May 17-20, 2008, Amsterdam, The Netherlands.
Faller, Christof "Parametric Coding of Spatial Audio" These N, 2004.
Geier, M. et al "Object-Based Audio Reproduction and the Audio Scene Description Format" Organised Sound vol. 15, No. 3, pp. 21-227, Cambridge University Press 2010.
Hellerud, E. et al "Encoding Higher Order Ambisonics with AAC" 124th Audio Engineering Society Convention, May 17, 2008.
ISO/IEC FDIS 23003-1:2006(E). Information Technology—MPEG Audio Technologies Part 1: MPEG Surround. ISO/IEC JTC 1/SC 29/WG, Jul. 21, 2006.
ITU-R BS.775-1 Multichannel Stereophonic Sound System with and Without Accompanying Picture, 1992-1994, pp. 1-10.
Jot, Jean-Marc et al "Beyond Surround Sound-Creation, Coding and Reproduction of 3-D Audio Sountracks" AES Convention, presented at the 131st Convention, Oct. 20-23, 2011, New York, USA, pp. 1-11.
Miller III, Robert E Robin "Scalable Tri-Play Recording for Stereo, ITU 5.1/6.1 2D, and Periphonic 3D (with Height) Compatible Surround Sound Reproduction" AES presented at the 115th Convention Oct. 10-13, 2003, New York, NY, pp. 1-11.
Nachbar, C. et al "Ambix—A Suggested Ambisonics Format" Ambisonics Symposium, Lexington, KY, Jun. 2-3, 2011.
Peters, N. et al "Towards a Spatial Sound Description Interchange Format (SpatDIF)" Canadian Acoustics, vol. 35, No. 3, pp. 64-65, 2007.
Poletti, Mark "Unified Description of Ambisonics Using Real and Complex Spherical Harmonics" Ambisonics Symposium, Graz, Austria, Jun. 2009, pp. 1-10.
Pomberger, H. et al "An Ambisonics Format for Flexible Playback Layouts" Ambisonics Symposium Jun. 2009, pp. 1-8.
Pomberger, Hannes, Franz Zotter, and A. Sontacchi. "An ambisonics format for flexible playback layouts." Proc. 1st Ambisonics Symposium. 2009.

(56) References Cited

OTHER PUBLICATIONS

Shimada, O. et al "A Core Experiment Proposal for an Additional SAOC Functionality of Separating Real-Environment Signals into Multiple Objects" MPEG 2008/M15110, Jan. 2008, pp. 1-18.
Stofringsdal, B. et al "Conversion of Discretely Sampled Sound Field Data to Auralization Formats" Journal of the Audio Engineering Society vol. 54, No. 5, May 2006, pp. 380-400.

* cited by examiner

--Prior Art-- a)

METHODS, APPARATUS AND SYSTEMS FOR ENCODING AND DECODING OF MULTI-CHANNEL AMBISONICS AUDIO DATA

CROSS REFERENCE TO RELATED APPLICATION

This application is a continuation of U.S. patent application Ser. No. 18/489,606, filed Oct. 18, 2023, which is a continuation of U.S. patent application Ser. No. 17/392,210, filed Aug. 2, 2021, now U.S. Pat. No. 11,798,568, which is a divisional of U.S. patent application Ser. No. 16/580,738, filed Sep. 24, 2019, now U.S. Pat. No. 11,081,117, which is a divisional of U.S. patent application Ser. No. 16/403,224, filed May 3, 2019, now U.S. Pat. No. 10,460,737, which is a divisional of U.S. patent application Ser. No. 15/967,363, filed Apr. 30, 2018, now U.S. Pat. No. 10,381,013, which is a divisional of U.S. patent application Ser. No. 15/417,565, filed Jan. 27, 2017, now U.S. Pat. No. 9,984,694, which is a continuation of U.S. patent application Ser. No. 14/415,714, filed Jan. 19, 2015, now U.S. Pat. No. 9,589,571, which is the U.S. National Stage of International Application No. PCT/EP2013/065343, filed Jul. 19, 2013, which claims priority to European Patent Application 12290239.8, filed Jul. 19, 2012, each of which is incorporated by reference in its entirety.

FIELD OF THE INVENTION

The invention is in the field of Audio Compression, in particular compression and decompression of multi-channel audio signals and sound-field-oriented audio scenes, e.g. Higher Order Ambisonics (HOA).

BACKGROUND OF THE INVENTION

At present, compression schemes for multi-channel audio signals do not explicitly take into account how the input audio material has been generated or mixed. Thus, known audio compression technologies are not aware of the origin/mixing type of the content they shall compress. In known approaches, a "blind" signal transformation is performed, by which the multi-channel signal is decomposed into its signal components that are subsequently quantized and encoded. A disadvantage of such approaches is that the computation of the above-mentioned signal decomposition is computationally demanding, and it is difficult and error prone to find the best suitable and most efficient signal decomposition for a given segment of the audio scene.

SUMMARY OF THE INVENTION

The present invention relates to a method and a device for improving multi-channel audio rendering.

It has been found that at least some of the above-mentioned disadvantages are due to the lack of prior knowledge on the characteristics of the scene composition. Especially for spatial audio content, e.g. multichannel-audio or Higher-Order Ambisonics (HOA) content, this prior information is useful in order to adapt the compression scheme. For instance, a common pre-processing step in compression algorithms is an audio scene analysis, which targets at extracting directional audio sources or audio objects from the original content or original content mix. Such directional audio sources or audio objects can be coded separately from the residual spatial audio content.

In one embodiment, a method for encoding pre-processed audio data comprises steps of encoding the pre-processed audio data, and encoding auxiliary data that indicate the particular audio pre-processing.

In one embodiment, the invention relates to a method for decoding encoded audio data, comprising steps of determining that the encoded audio data had been pre-processed before encoding, decoding the audio data, extracting from received data information about the pre-processing, and post-processing the decoded audio data according to the extracted pre-processing information. The step of determining that the encoded audio data had been pre-processed before encoding can be achieved by analysis of the audio data, or by analysis of accompanying metadata.

In one embodiment of the invention, an encoder for encoding pre-processed audio data comprises a first encoder for encoding the pre-processed audio data, and a second encoder for encoding auxiliary data that indicate the particular audio pre-processing.

In one embodiment of the invention, a decoder for decoding encoded audio data comprises an analyzer for determining that the encoded audio data had been pre-processed before encoding, a first decoder for decoding the audio data, a data stream parser unit or data stream extraction unit for extracting from received data information about the pre-processing, and a processing unit for post-processing the decoded audio data according to the extracted pre-processing information.

In one embodiment of the invention, a computer readable medium has stored thereon executable instructions to cause a computer to perform a method according to at least one of the above-described methods.

A general idea of the invention is based on at least one of the following extensions of multi-channel audio compression systems:

According to one embodiment, a multi-channel audio compression and/or rendering system has an interface that comprises the multi-channel audio signal stream (e.g. PCM streams), the related spatial positions of the channels or corresponding loudspeakers, and metadata indicating the type of mixing that had been applied to the multi-channel audio signal stream. The mixing type indicate for instance a (previous) use or configuration and/or any details of HOA or VBAP panning, specific recording techniques, or equivalent information. The interface can be an input interface towards a signal transmission chain. In the case of HOA content, the spatial positions of loudspeakers can be positions of virtual loudspeakers.

According to one embodiment, the bit stream of a multi-channel compression codec comprises signaling information in order to transmit the above-mentioned metadata about virtual or real loudspeaker positions and original mixing information to the decoder and subsequent rendering algorithms. Thereby, any applied rendering techniques on the decoding side can be adapted to the specific mixing characteristics on the encoding side of the particular transmitted content.

In one embodiment, the usage of the metadata is optional and can be switched on or off. I.e., the audio content can be decoded and rendered in a simple mode without using the metadata, but the decoding and/or rendering will be not optimized in the simple mode. In an enhanced mode, optimized decoding and/or rendering can be achieved by making use of the metadata. In this embodiment, the decoder/renderer can be switched between the two modes.

In one embodiment, methods or apparatus may pre-process audio data, including by detecting that the audio data of a first Higher-Order Ambisonics (HOA) format comprising of HOA time-domain coefficients. The first HOA format audio data may be transformed to a common HOA format audio data which relates a multi-channel representation of the first HOA format audio data. The common HOA format audio data and metadata that indicates a coding mode of the common HOA format audio data may then be transmitted. The metadata may indicate that audio content was derived from HOA content or an order of the HOA content representation, a 2D, 3D or hemispherical representation, or positions of spatial sampling points. The first HOA format audio data may be complex-valued harmonics, real-valued spherical harmonics, or a normalization scheme. The metadata may indicate that the coding mode is a simple mode wherein the common HOA format audio content can be decoded and rendered in a simple mode without optimization. The metadata may indicate that the coding mode is an optimized mode indicating a spatial decomposition for transforming from the first HOA format audio data to the common HOA format audio data. The optimized mode may indicate that the common HOA format audio data is based on an optimized decomposition that modifies a number of signals for transporting the first HOA format audio data.

In another embodiment, methods or apparatus may post-process audio data, including by receiving audio data of a common HOA format and metadata that indicates that the audio data is based on the common HOA format. Based on the metadata, information may be extracted about a first HOA format audio data. And, by converting the common format HOA audio data to the first HOA format audio data based on the information about the first HOA format audio data. The converting may be based on a Discrete Spherical Harmonics Transform (DSHT). The metadata may relate to at least one of an order of the HOA content representation, a 2D, 3D or hemispherical representation, and positions of spatial sampling points. The first HOA format audio data is at least one of a type of: a complex-valued harmonics, real-valued spherical harmonics, and a normalization scheme. The metadata may indicate a simple mode indicating that the information about the first HOA format audio data is stored in a decoder. The metadata may indicate that the common HOA format was based on an optimized spatial decomposition that reduced a number of signals of the first HOA format audio data.

In another embodiment, there may be provided methods, apparatus, computer readable storage medium code performing instructions, and/or systems for decoding an encoded bitstream of multi-channel audio data and associated metadata. The encoded bitstream of multi-channel audio data may be decoded into multi-channel audio data. A detection of whether the multi-channel audio data includes a first Ambisonics format may be performed. The first Ambisonics format of the multi-channel audio data is transformed to a second Ambisonics format representation of the multi-channel audio data. The transforming maps the first Ambisonics format multi-channel audio data into the second Ambisonics format multi-channel representation of the audio data. The detecting is based on at least part of the associated metadata that indicates the existence of the first Ambisonics format multi-channel audio data.

The associated metadata further describes re-mixing information. The transformation is based on the re-mixing information indicated by the associated metadata. The metadata further indicates that the second Ambisonics format multi-channel representation of the audio data are normalized based on a normalization scheme. The metadata further indicates an order of the second Ambisonics format.

In another embodiment, there may be provided methods, apparatus, computer readable storage medium code performing instructions, and/or systems for encoding audio data. The multi-channel audio data is encoded to include audio data in an Ambisonics format. The encoding includes transforming the encoded multi-channel audio data into a second format encoded multi-channel audio data. Auxiliary data is determined, where the auxiliary data includes mixing information relating to the encoded second format encoded multi-channel audio data. A bitstream is transmitted containing the second format encoded multi-channel audio data and associated metadata relating to the auxiliary data.

BRIEF DESCRIPTION OF THE DRAWINGS

Advantageous exemplary embodiments of the invention are described with reference to the accompanying drawings, which show in FIG. 1 shows the structure of a known multi-channel transmission system.

DETAILED DESCRIPTION OF THE INVENTION

Figure 1:
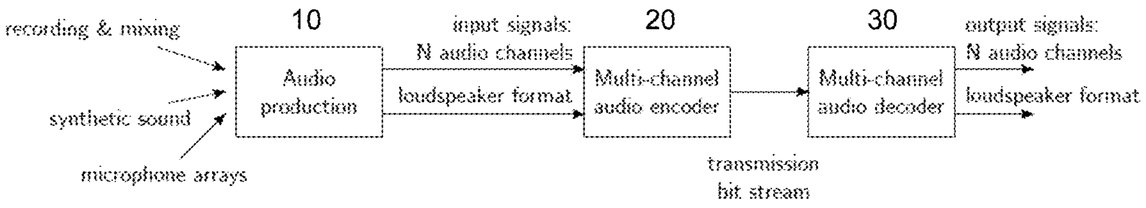

FIG. 1 shows a known approach for multi-channel audio coding. Audio data from an audio production stage 10 are encoded in a multi-channel audio encoder 20, transmitted and decoded in a multi-channel audio decoder 30. Metadata may explicitly be transmitted (or their information may be included implicitly) and related to the spatial audio composition. Such conventional metadata are limited to information on the spatial positions of loudspeakers, e.g. in the form of specific formats (e.g. stereo or ITU-R BS.775-1 also known as "5.1 surround sound") or by tables with loudspeaker positions. No information on how a specific spatial audio mix/recording has been produced is communicated to the multi-channel audio encoder 20, and thus such information cannot be exploited or utilized in compressing the signal within the multi-channel audio encoder 20.

However, it has been recognized that knowledge of at least one of origin and mixing type of the content is of particular importance if a multi-channel spatial audio coder processes at least one of content that has been derived from a Higher-Order Ambisonics (HOA) format, a recording with any fixed microphone setup and a multi-channel mix with any specific panning algorithms, because in these cases the specific mixing characteristics can be exploited by the compression scheme. Also, original multi-channel audio content can benefit from additional mixing information indication. It is advantageous to indicate e.g. a used panning method such as e.g. Vector-Based Amplitude Panning (VBAP), or any details thereof, for improving the encoding efficiency. Advantageously, the signal models for the audio scene analysis, as well as the subsequent encoding steps, can be adapted according to this information. This results in a more efficient compression system with respect to both rate-distortion performance and computational effort.

In the particular case of HOA content, there is the problem that many different conventions exist, e.g. complex-valued vs. real-valued spherical harmonics, multiple/different normalization schemes, etc. In order to avoid incompatibilities between differently produced HOA content, it is useful to define a common format. This can be achieved via a transformation of the HOA time-domain coefficients to its equivalent spatial representation, which is a multi-channel representation, using a transform such as the Discrete Spherical Harmonics Transform (DSHT). The DSHT is created from a regular spherical distribution of spatial sampling positions, which can be regarded equivalent to virtual loudspeaker positions. More definitions and details about the DSHT are given below. Any system using another definition of HOA is able to derive its own HOA coefficients representation from this common format defined in the spatial domain. Compression of signals of said common format benefits considerably from the prior knowledge that the virtual loudspeaker signals represent an original HOA signal, as described in more detail below.

Furthermore, this mixing information etc. is also useful for the decoder or renderer. In one embodiment, the mixing information etc. is included in the bit stream. The used rendering algorithm can be adapted to the original mixing e.g. HOA or VBAP, to allow for a better down-mix or rendering to flexible loudspeaker positions.

Figure 2:
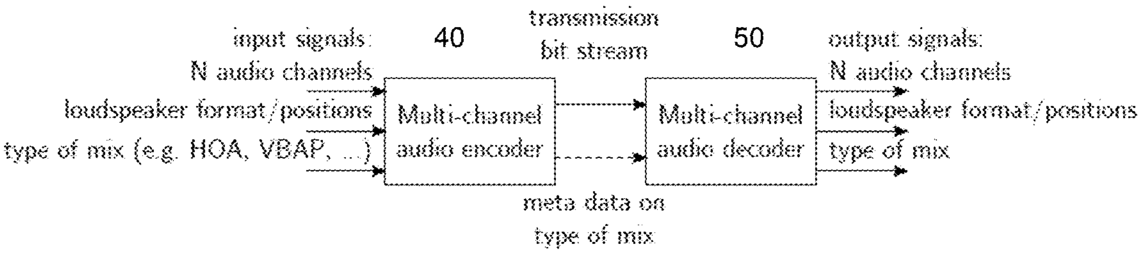
FIG. 2 shows the structure of a multi-channel transmission system according to one embodiment of the invention.

FIG. 2 shows an extension of the multi-channel audio transmission system according to one embodiment of the invention. The extension is achieved by adding metadata that describe at least one of the type of mixing, type of recording, type of editing, type of synthesizing etc. that has been applied in the production stage 10 of the audio content. This information is carried through to the decoder output and can be used inside the multi-channel compression codec 40,50 in order to improve efficiency. The information on how a specific spatial audio mix/recording has been produced is communicated to the multi-channel audio encoder 40, and thus can be exploited or utilized in compressing the signal.

One example as to how this metadata information can be used is that, depending on the mixing type of the input material, different coding modes can be activated by the multi-channel codec. For instance, in one embodiment, a coding mode is switched to a HOA-specific encoding/decoding principle (HOA mode), as described below (with respect to eq. (3)-(16)) if HOA mixing is indicated at the encoder input, while a different (e.g. more traditional) multi-channel coding technology is used if the mixing type of the input signal is not HOA, or unknown. In the HOA mode, the encoding starts in one embodiment with a DSHT block in which a DSHT regains the original HOA coefficients, before a HOA-specific encoding process is started. In another embodiment, a different discrete transform other than DSHT is used for a comparable purpose.

Figure 3:
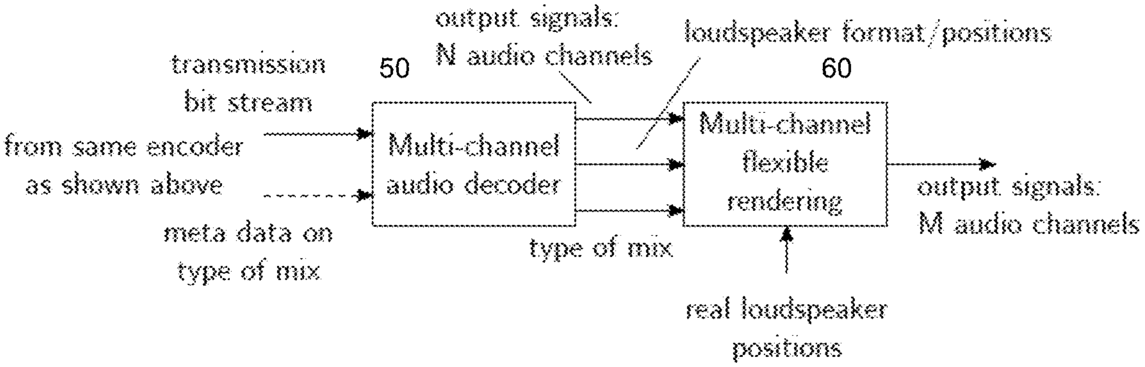
FIG. 3 shows a smart decoder according to one embodiment of the invention.

FIG. 3 shows a "smart" rendering system according to one embodiment of the invention, which makes use of the inventive metadata in order to accomplish a flexible down-mix, up-mix or re-mix of the decoded N channels to M loudspeakers that are present at the decoder terminal. The metadata on the type of mixing, recording etc. can be exploited for selecting one of a plurality of modes, so as to accomplish efficient, high-quality rendering. A multi-channel encoder 50 uses optimized encoding, according to metadata on the type of mix in the input audio data, and encodes/provides not only N encoded audio channels and information about loudspeaker positions, but also e.g. "type of mix" information to the decoder 60. The decoder 60 (at the receiving side) uses real loudspeaker positions of loudspeakers available at the receiving side, which are unknown at the transmitting side (i.e. encoder), for generating output signals for M audio channels. In one embodiment, N is different from M. In one embodiment, N equals M or is different from M, but the real loudspeaker positions at the receiving side are different from loudspeaker positions that were assumed in the encoder 50 and in the audio production 10. The encoder 50 or the audio production 10 may assume e.g. standardized loudspeaker positions.

Figure 4:
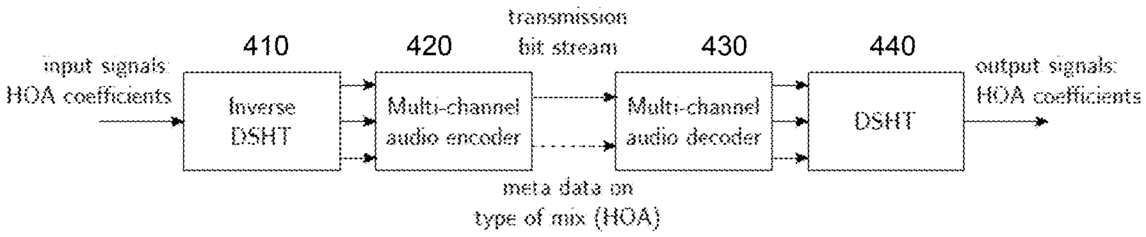
FIG. 4 shows the structure of a multi-channel transmission system for HOA signals.

FIG. 4 shows how the invention can be used for efficient transmission of HOA content. The input HOA coefficients are transformed into the spatial domain via an inverse DSHT (iDSHT) 410. The resulting N audio channels, their (virtual) spatial positions, as well as an indication (e.g. a flag such as a "HOA mixed" flag) are provided to the multi-channel audio encoder 420, which is a compression encoder. The compression encoder can thus utilize the prior knowledge that its input signals are HOA-derived. An interface between the audio encoder 420 and an audio decoder 430 or audio renderer comprises N audio channels, their (virtual) spatial positions, and said indication. An inverse process is performed at the decoding side, i.e. the HOA representation can be recovered by applying, after decoding 430, a DSHT 440 that uses knowledge of the related operations that had been applied before encoding the content. This knowledge is received through the interface in form of the metadata according to the invention.

Some (but not necessarily all) kinds of metadata that are in particular within the scope of this invention would be, for example, at least one of the following:

- an indication that original content was derived from HOA content, plus at least one of:
  - an order of the HOA representation
  - indication of 2D, 3D or hemispherical representation; and
  - positions of spatial sampling points (adaptive or fixed)
- an indication that original content was mixed synthetically using VBAP, plus an assignment of VBAP tupels (pairs) or triples of loudspeakers; and
- an indication that original content was recorded with fixed, discrete microphones, plus at least one of:
  - one or more positions and directions of one or more microphones on the recording set; and
  - one or more kinds of microphones, e.g. cardoid vs. omnidirectional vs. super-cardoid, etc.

Main advantages of the invention are at least the following.

A more efficient compression scheme is obtained through better prior knowledge on the signal characteristics of the input material. The encoder can exploit this prior knowledge for improved audio scene analysis (e.g. a source model of mixed content can be adapted). An example for a source model of mixed content is a case where a signal source has been modified, edited or synthesized in an audio production stage 10. Such audio production stage 10 is usually used to generate the multichannel audio signal, and it is usually located before the multi-channel audio encoder block 20. Such audio production stage 10 is also assumed (but not shown) in FIG. 2 before the new encoding block 40. Conventionally, the editing information is lost and not passed to the encoder, and can therefore not be exploited. The present invention enables this information to be preserved. Examples of the audio production stage 10 comprise recording and mixing, synthetic sound or multi-microphone information, e.g., multiple sound sources that are synthetically mapped to loudspeaker positions.

Another advantage of the invention is that the rendering of transmitted and decoded content can be considerably improved, in particular for ill-conditioned scenarios where a number of available loudspeakers is different from a number of available channels (so-called down-mix and up-mix scenarios), as well as for flexible loudspeaker positioning. The latter requires re-mapping according to the loudspeaker position(s).

Yet another advantage is that audio data in a sound field related format, such as HOA, can be transmitted in channel-based audio transmission systems without losing important data that are required for high-quality rendering.

The transmission of metadata according to the invention allows at the decoding side an optimized decoding and/or rendering, particularly when a spatial decomposition is performed. While a general spatial decomposition can be obtained by various means, e.g. a Karhunen-Loève Transform (KLT), an optimized decomposition (using metadata according to the invention) is less computationally expensive and, at the same time, provides a better quality of the multi-channel output signals (e.g. the single channels can easier be adapted or mapped to loudspeaker positions during the rendering, and the mapping is more exact). This is particularly advantageous if the number of channels is modified (increased or decreased) in a mixing (matrixing) stage during the rendering, or if one or more loudspeaker positions are modified (especially in cases where each channel of the multi-channels is adapted to a particular loudspeaker position).

In the following, the Higher Order Ambisonics (HOA) and the Discrete Spherical Harmonics Transform (DSHT) are described.

HOA signals can be transformed to the spatial domain, e.g. by a Discrete Spherical Harmonics Transform (DSHT), prior to compression with perceptual coders.

The transmission or storage of such multi-channel audio signal representations usually demands for appropriate multi-channel compression techniques. Usually, a channel independent perceptual decoding is performed before finally matrixing the I decoded signals $\hat{x}_i(l)$, i=1, . . . , I, into J new signals $\hat{y}_j(l)$, j=1, . . . , J. The term matrixing means adding or mixing the decoded signals $\hat{x}_i(l)$ in a weighted manner. Arranging all signals $\hat{x}_i(l)$, i=1, . . . , I, as well as all new signals $\hat{y}_j(l)$, j=1, . . . , J in vectors according to $$\hat{x}(l) := \left[\hat{x}_1(l) \ldots \hat{x}_I(l)\right]^T \tag{1a}$$

$$\hat{y}(l) := \left[\hat{y}_1(l) \ldots \hat{y}_J(l)\right]^T \tag{1b}$$

the term "matrixing" origins from the fact that $\hat{y}(l)$ is, mathematically, obtained from $\hat{x}(l)$ through a matrix operation $$\hat{y}(l) = A\hat{x}(l) \tag{2}$$

where A denotes a mixing matrix composed of mixing weights. The terms "mixing" and "matrixing" are used synonymously herein. Mixing/matrixing is used for the purpose of rendering audio signals for any particular loudspeaker setups.

The particular individual loudspeaker set-up on which the matrix depends, and thus the matrix that is used for matrixing during the rendering, is usually not known at the perceptual coding stage.

The following section gives a brief introduction to Higher Order Ambisonics (HOA) and defines the signals to be processed (data rate compression).

Higher Order Ambisonics (HOA) is based on the description of a sound field within a compact area of interest, which is assumed to be free of sound sources. In that case the spatiotemporal behavior of the sound pressure p(t, x) at time t and position $x=[r, \theta, \phi]^T$ within the area of interest (in spherical coordinates) is physically fully determined by the homogeneous wave equation. It can be shown that the Fourier transform of the sound pressure with respect to time, i.e., $$P(\omega, x) = \mathcal{F}_t\{p(t, x)\} \tag{3}$$

where ω denotes the angular frequency (and $\mathcal{F}_t\{\ \}$ corresponds to $$\int_{-\infty}^{\infty} p(t, x)e^{-\omega t}dt\Big),$$

may be expanded into the series of Spherical Harmonics (SHs) according to:

$$P(kc_s, x) = \sum_{n=0}^{\infty}\sum_{m=-n}^{n} A_n^m(k) j_n(kr) Y_n^m(\theta, \phi) \tag{4}$$

In eq. (4), $c_s$ denotes the speed of sound and $$k = \frac{\omega}{c_s}$$

the angular wave number. Further, $j_n(\bullet)$ indicate the spherical Bessel functions of the first kind and order n and $$Y_n^m(\cdot)$$

denote the Spherical Harmonics (SH) of order n and degree m. The complete information about the sound field is actually contained within the sound field coefficients $$A_n^m(k).$$

It should be noted that the SHs are complex valued functions in general. However, by an appropriate linear combination of them, it is possible to obtain real valued functions and perform the expansion with respect to these functions.

Related to the pressure sound field description in eq. (4), a source field can be defined as:

$$D(kc_s,\Omega)=\sum_{n=0}^{\infty}\sum_{m=-n}^{n}B_n^m(k)Y_n^m(\Omega), \tag{5}$$

with the source field or amplitude density [9] D(k $c_s$, Ω) depending on angular wave number and angular direction $\Omega=[\theta,\phi]^T$. A source field can consist of far-field/near-field, discrete/continuous sources [1]. The source field coefficients $$B_n^m$$

are related to the sound field coefficients $$A_n^m$$

by [1]:

$$A_n^m=\begin{cases}4\pi i^n B_n^m & \text{for the far field}\\ -ikh_n^{(2)}(kr_s)B_n^m & \text{for the near field}\end{cases} \tag{6}$$

where $$h_n^{(2)}$$

is the spherical Hankel function of the second kind and $r_s$ is the source distance from the origin. Concerning the near field, it is noted that positive frequencies and the spherical Hankel function of second kind $$h_n^{(2)}$$

are used for incoming waves (related to $e^{-ikr}$).

Signals in the HOA domain can be represented in frequency domain or in time domain as the inverse Fourier transform of the source field or sound field coefficients. The following description will assume the use of a time domain representation of source field coefficients:

$$b_n^m=i\mathcal{F}_t\{B_n^m\} \tag{7}$$

of a finite number: The infinite series in eq. (5) is truncated at n=N. Truncation corresponds to a spatial bandwidth limitation. The number of coefficients (or HOA channels) is given by:

$$O_{3D}=(N+1)^2 \text{ for } 3D \tag{8}$$

or by $O_{2D}$=2N+1 for 2D only descriptions. The coefficients $$b_n^m$$

comprise the Audio information of one time sample m for later reproduction by loudspeakers. They can be stored or transmitted and are thus subject to data rate compression. A single time sample m of coefficients can be represented by vector b(m) with $O_{3D}$ elements:

$$b(m):=\left[b_0^0(m),b_1^{-1}(m),b_1^0(m),b_1^1(m),b_2^{-2}(m),\ldots,b_N^N(m)\right]^T \tag{9}$$

and a block of M time samples by matrix B $$B:=[b(m_{START}+1),b(m_{START}+2),\ldots,b(m_{START}+M)] \tag{10}$$

Two dimensional representations of sound fields can be derived by an expansion with circular harmonics. This is can be seen as a special case of the general description presented above using a fixed inclination of $$\theta=\frac{\pi}{2},$$

different weighting of coefficients and a reduced set to $O_{2D}$ coefficients (m=±n). Thus, all of the following considerations also apply to 2D representations, the term sphere then needs to be substituted by the term circle.

The following describes a transform from HOA coefficient domain to a spatial, channel based, domain and vice versa. Eq. (5) can be rewritten using time domain HOA coefficients for l discrete spatial sample positions $\Omega_l=[\theta_l,\phi_l]^T$ on the unit sphere:

$$d_{\Omega_l}:=\sum_{n=0}^{N}\sum_{m=-n}^{n}b_n^m\,Y_n^m(\Omega_l), \tag{11}$$

Assuming $L_{sd}=(N+1)^2$ spherical sample positions $\Omega_l$, this can be rewritten in vector notation for a HOA data block B:

$$W=\Psi_i B, \tag{12}$$

$$\text{with } W:=[w(m_{START}+1),w(m_{START}+2),\ldots,w(m_{START}+M)] \text{ and}$$

$$w(m)=\left[d_{\Omega_1}(m),\ldots,d_{\Omega_{L_{sd}}}(m)\right]^T$$

representing a single time-sample of a $L_{sd}$ multichannel signal, and matrix $\Psi_i=[y_1,\ldots,y_{L_{sd}}]^H$ with vectors $$y_l=\left[Y_0^0(\Omega_l),Y_1^{-1}(\Omega_l),\ldots,Y_N^N(\Omega_l)\right]^T.$$

If the spherical sample positions are selected very regular, a matrix $\Psi_f$ exists with $$\Psi_f\Psi_i=I, \tag{13}$$

where I is a $O_{3D} \times O_{3D}$ identity matrix. Then the corresponding transformation to eq. (12) can be defined by:

$$B = \Psi_f W. \tag{14}$$

Eq. (14) transforms $L_{sd}$ spherical signals into the coefficient domain and can be rewritten as a forward transform:

$$B = DSHT\{W\}, \tag{15}$$

where DSHT{⬚} denotes the Discrete Spherical Harmonics Transform. The corresponding inverse transform, transforms $O_{3D}$ coefficient signals into the spatial domain to form $L_{sd}$ channel based signals and eq. (12) becomes:

$$W = iDSHT\{B\}. \tag{16}$$

Figure 5:
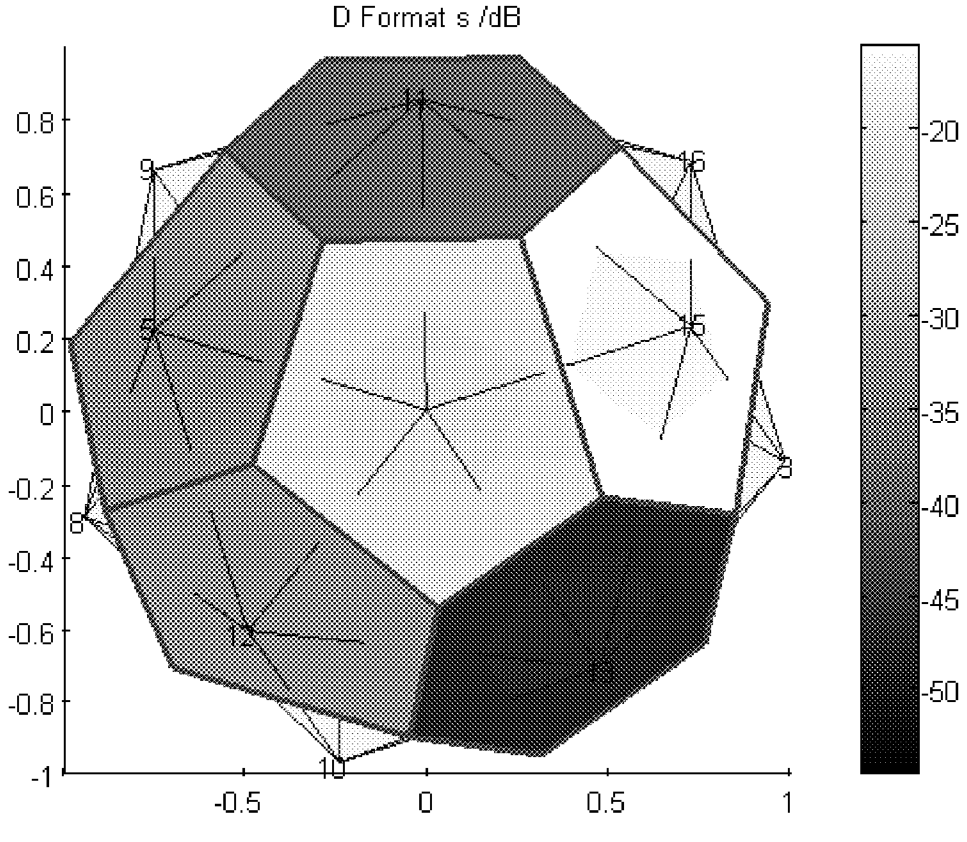
FIG. 5 shows spatial sampling points of a DSHT.

The DSHT with a number of spherical positions $L_{Sd}$ matching the number of HOA coefficients $O_{3D}$ (see eq. (8)) is described below. First, a default spherical sample grid is selected. For a block of M time samples, the spherical sample grid is rotated such that the logarithm of the term $$\sum_{l=1}^{L_{Sd}} \sum_{j=1}^{L_{Sd}} \left|\sum_{W_{Sd_{l,j}}}\right| - \sum\left(\sigma^2_{S_{d_1}}, \ldots, \sigma^2_{S_{d_{L_{Sd}}}}\right) \tag{17}$$

is minimized, where $$\left|\sum_{W_{Sd_{l,j}}}\right|$$

are the absolute values of the elements $\Sigma_{W_{Sd}}$ (with matrix row index l and column index j) and $$\sigma^2_{S_{d_l}}$$

are the diagonal elements of $\Sigma_{W_{Sd}}$. Visualized, this corresponds to the spherical sampling grid of the DSHT as shown in FIG. 5.

Figure 6:
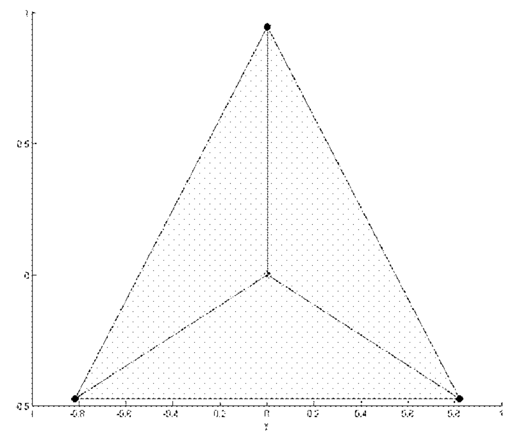
FIG. 6 shows examples of spherical sampling positions for a codebook used in encoder and decoder building blocks.
Figure 6:
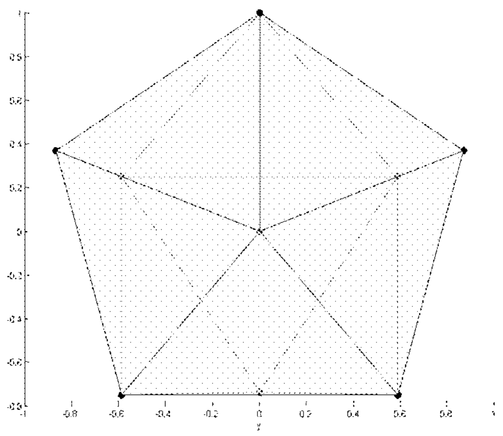
Figure 6:
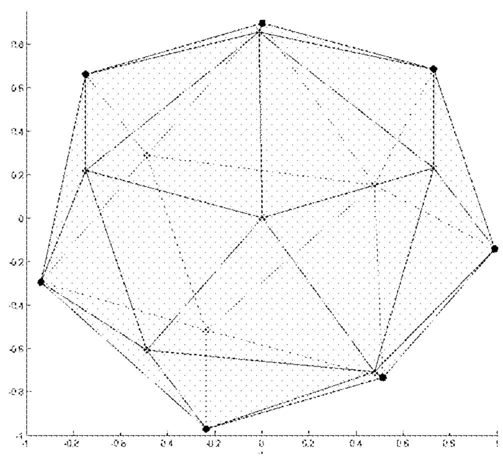
Figure 6:
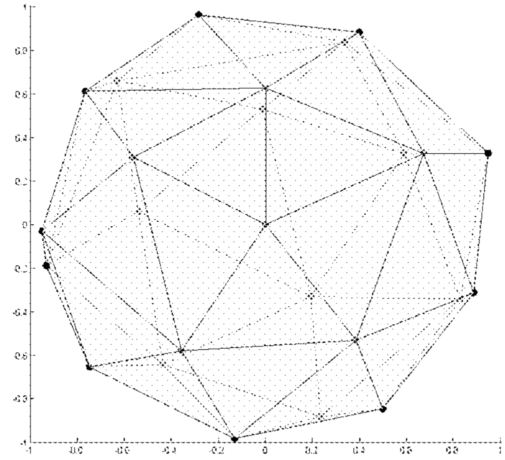

Suitable spherical sample positions for the DSHT and procedures to derive such positions are well-known. Examples of sampling grids are shown in FIG. 6. In particular, FIG. 6 shows examples of spherical sampling positions for a codebook used in encoder and decoder building blocks pE, pD, namely in FIG. 6*a*) for $L_{Sd}=4$, in FIG. 6*b*) for $L_{Sd}=9$, in FIG. 6*c*) for $L_{Sd}=16$ and in FIG. 6*d*) for $L_{Sd}=25$. Such codebooks can, inter alia, be used for rendering according to pre-defined spatial loudspeaker configurations.

Figure 7:
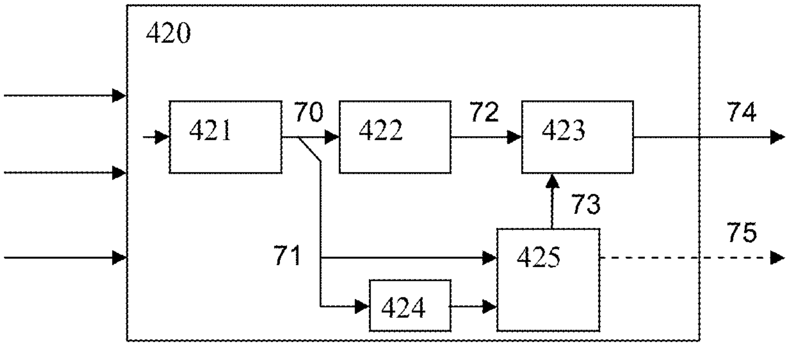
FIG. 7 shows an exemplary embodiment of a particularly improved multi-channel audio encoder.

FIG. 7 shows an exemplary embodiment of a particularly improved multi-channel audio encoder 420 shown in FIG. 4. It comprises a DSHT block 421, which calculates a DSHT that is inverse to the Inverse DSHT of block 410 (in order to reverse the block 410). The purpose of block 421 is to provide at its output 70 signals that are substantially identical to the input of the Inverse DSHT block 410. The processing of this signal 70 can then be further optimized. The signal 70 comprises not only audio components that are provided to an MDCT block 422, but also signal portions 71 that indicate one or more dominant audio signal components, or rather one or more locations of dominant audio signal components. These are then used for detecting 424 at least one strongest source direction and calculating 425 rotation parameters for an adaptive rotation of the iDSHT. In one embodiment, this is time variant, i.e. the detecting 424 and calculating 425 is continuously re-adapted at defined discrete time steps. The adaptive rotation matrix for the iDSHT is calculated and the adaptive iDSHT is performed in the iDSHT block 423. The effect of the rotation is that the sampling grid of the iDSHT 423 is rotated such that one of the sides (i.e. a single spatial sample position) matches the strongest source direction (this may be time variant). This provides a more efficient and therefore better encoding of the audio signal in the iDSHT block 423. The MDCT block 422 is advantageous for compensating the temporal overlapping of audio frame segments. The iDSHT block 423 provides an encoded audio signal 74, and the rotation parameter calculating block 425 provides rotation parameters as (at least a part of) pre-processing information 75. Additionally, the pre-processing information 75 may comprise other information.

Further, the present invention relates to the following embodiments.

In one embodiment, the invention relates to a method for transmitting and/or storing and processing a channel based 3D-audio representation, comprising steps of sending/storing side information (SI) along the channel based audio information, the side information indicating the mixing type and intended speaker position of the channel based audio information, where the mixing type indicates an algorithm according to which the audio content was mixed (e.g. in the mixing studio) in a previous processing stage, where the speaker positions indicate the positions of the speakers (ideal positions e.g. in the mixing studio) or the virtual positions of the previous processing stage. Further processing steps, after receiving said data structure and channel based audio information, utilize the mixing & speaker position information.

In one embodiment, the invention relates to a device for transmitting and/or storing and processing a channel based 3D-audio representation, comprising means for sending (or means for storing) side information (SI) along the channel based Audio information, the side information indicating the mixing type and intended speaker position of the channel based audio information, where the mixing type signals the algorithm according to which the audio content was mixed (e.g. in the mixing studio) in a previous processing stage, where the speaker positions indicate the positions of the speakers (ideal positions e.g. in the mixing studio) or the virtual positions of the previous processing stage. Further, the device comprises a processor that utilizes the mixing & speaker position information after receiving said data structure and channel based audio information.

In one embodiment, the present invention relates to a 3D audio system where the mixing information signals HOA content, the HOA order and virtual speaker position information that relates to an ideal spherical sampling grid that has been used to convert HOA 3D audio to the channel based representation before. After receiving/reading transmitted channel based audio information and accompanying side information (SI), the SI is used to re-encode the channel based audio to HOA format. Said re-encoding is done by calculating a mode-matrix $\Psi$ from said spherical sampling positions and matrix multiplying it with the channel based content (DSHT).

In one embodiment, the system/method is used for circumventing ambiguities of different HOA formats. The HOA 3D audio content in a $1^{st}$ HOA format at the production side is converted to a related channel based 3D audio representation using the iDSHT related to the $1^{st}$ format and distributed in the SI. The received channel based audio information is converted to a $2^{nd}$ HOA format using SI and a DSHT related to the $2^{nd}$ format. In one embodiment of the system, the $1^{st}$ HOA format uses a HOA representation with complex values and the $2^{nd}$ HOA format uses a HOA representation with real values. In one embodiment of the system, the $2^{nd}$ HOA format uses a complex HOA representation and the $1^{st}$ HOA format uses a HOA representation with real values.

In one embodiment, the present invention relates to a 3D audio system, wherein the mixing information is used to separate directional 3D audio components (audio object extraction) from the signal used within rate compression, signal enhancement or rendering. In one embodiment, further steps are signaling HOA, the HOA order and the related ideal spherical sampling grid that has been used to convert HOA 3D audio to the channel based representation before, restoring the HOA representation and extracting the directional components by determining main signal directions by use of block based covariance methods. Said directions are used for HOA decoding the directional signals to these directions. In one embodiment, the further steps are signaling Vector Base Amplitude Panning (VBAP) and related speaker position information, where the speaker position information is used to determine the speaker triplets and a covariance method is used to extract a correlated signal out of said triplet channels.

In one embodiment of the 3D audio system, residual signals are generated from the directional signals and the restored signals related to the signal extraction (HOA signals, VBAP triplets (pairs)).

In one embodiment, the present invention relates to a system to perform data rate compression of the residual signals by steps of reducing the order of the HOA residual signal and compressing reduced order signals and directional signals, mixing the residual triplet channels to a mono stream and providing related correlation information, and transmitting said information and the compressed mono signals together with compressed directional signals.

In one embodiment of the system to perform data rate compression, it is used for rendering audio to loudspeakers, wherein the extracted directional signals are panned to loudspeakers using the main signal directions and the decorrelated residual signals in the channel domain.

The invention allows generally a signalization of audio content mixing characteristics. The invention can be used in audio devices, particularly in audio encoding devices, audio mixing devices and audio decoding devices.

It should be noted that although shown simply as a DSHT, other types of transformation may be constructed or applied other than a DSHT, as would be apparent to those of ordinary skill in the art, all of which are contemplated within the spirit and scope of the invention. Further, although the HOA format is exemplarily mentioned in the above description, the invention can also be used with other types of soundfield related formats other than Ambisonics, as would be apparent to those of ordinary skill in the art, all of which are contemplated within the spirit and scope of the invention.

While there has been shown, described, and pointed out fundamental novel features of the present invention as applied to preferred embodiments thereof, it will be understood that various omissions and substitutions and changes in the apparatus and method described, in the form and details of the devices disclosed, and in their operation, may be made by those skilled in the art without departing from the spirit of the present invention. It will be understood that the present invention has been described purely by way of example, and modifications of detail can be made without departing from the scope of the invention. It is expressly intended that all combinations of those elements that perform substantially the same function in substantially the same way to achieve the same results are within the scope of the invention. Substitutions of elements from one described embodiment to another are also fully intended and contemplated.

REFERENCES

[1] T. D. Abhayapala "Generalized framework for spherical microphone arrays: Spatial and frequency decomposition", In Proc. IEEE International Conference on Acoustics, Speech, and Signal Processing (ICASSP), (accepted) Vol. X, pp., April 2008, Las Vegas, USA.

[2] James R. Driscoll and Dennis M. Healy Jr.: "Computing Fourier transforms and convolutions on the 2-sphere", Advances in Applied Mathematics, 15:202-250, 1994

The invention claimed is:

1. A method for decoding an encoded bitstream of Ambisonics audio data and associated metadata, the method comprising:

receiving the encoded bitstream comprising the Ambisonics audio data and the associated metadata;

determining, based on at least one part of the associated metadata, that the Ambisonics audio data comprises a common Ambisonics format;

determining, based on at least one or more other part(s) of the associated metadata, an order of the Ambisonics audio data and re-mixing matrix; and transforming the Ambisonics audio data from the common Ambisonics format to a different Ambisonics format, wherein the transforming the common Ambisonics format is based on the Ambisonics re-mixing matrix and the order of the Ambisonics audio data, wherein the re-mixing matrix is selected based on a coding mode indicative of how to decode the common Ambisonics format.

2. A non-transitory computer program product storing a computer program, the computer program when executed by a device including a processor and a memory performs the method of claim 1.

3. An apparatus for decoding an encoded bitstream of Ambisonics audio data and associated metadata, the apparatus comprising:

a receiver for receiving the encoded bitstream comprising the Ambisonics audio data and the associated metadata;

a first processor for determining, based on at least one part of the associated metadata, that the Ambisonics audio data comprises a common Ambisonics format;

a second processor for determining, based on at least one or more other part(s) of the associated metadata, an order of the Ambisonics audio data and a re-mixing matrix; and a third processor for transforming the Ambisonics audio data from the common Ambisonics format to a different Ambisonics format, wherein the transforming the common Ambisonics format is based on the Ambisonics re-mixing matrix and the order of the Ambisonics audio data, wherein the re-mixing matrix is selected based on a coding mode indicative of how to decode the common Ambisonics format.

* * * * *